(12) United States Patent
Maeda

(10) Patent No.: US 9,456,093 B2
(45) Date of Patent: Sep. 27, 2016

(54) IMAGE PROCESSING APPARATUS ON WHICH OUTPUT CANDIDATE IMAGES LESS THAN OR EQUAL TO A PREDETERMINED NUMBER ARE SELECTABLY DISPLAYED

(71) Applicant: KYOCERA Document Solutions Inc., Osaka (JP)

(72) Inventor: Koji Maeda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/832,929

(22) Filed: Aug. 21, 2015

(65) Prior Publication Data

US 2016/0057299 A1 Feb. 25, 2016

(30) Foreign Application Priority Data

Aug. 21, 2014 (JP) ................................. 2014-168336
Feb. 27, 2015 (JP) ................................. 2015-038139

(51) Int. Cl.
| | | |
|---|---|---|
| G06F 3/041 | (2006.01) | |
| H04N 1/00 | (2006.01) | |
| G06F 3/0488 | (2013.01) | |
| G06F 3/044 | (2006.01) | |

(52) U.S. Cl.
CPC ........... *H04N 1/00411* (2013.01); *G06F 3/044* (2013.01); *G06F 3/0418* (2013.01); *G06F 3/0488* (2013.01); *H04N 1/00453* (2013.01); *H04N 1/00474* (2013.01); *H04N 1/00482* (2013.01); *G06F 2203/04101* (2013.01); *H04N 2201/0094* (2013.01)

(58) Field of Classification Search
CPC ........................... G03G 15/5016; G06F 3/044
USPC ............................................. 399/81; 345/174
See application file for complete search history.

(56) References Cited

U.S. PATENT DOCUMENTS

| | | | | |
|---|---|---|---|---|
| 2011/0221693 | A1* | 9/2011 | Miyazaki | ....................... 345/173 |
| 2012/0026113 | A1* | 2/2012 | Kasahara | ....................... 345/173 |

FOREIGN PATENT DOCUMENTS

JP     2009-279017 A    12/2009

\* cited by examiner

*Primary Examiner* — Walter L Lindsay, Jr.
*Assistant Examiner* — Milton Gonzalez
(74) *Attorney, Agent, or Firm* — Hawaii Patent Services; Nathaniel K. Fedde; Kenton N. Fedde

(57) ABSTRACT

Provided is an image processing apparatus including a display part that has a display area on which output candidate images less than or equal to a predetermined number are selectably displayed, a distance detecting part that detects a spatial distance between the indicator and the display area, an area detecting part that detects an area of a projection image of the indicator on the display area when the detected spatial distance is less than or equal to a first distance, and a selection control part that executes a first selection process for displaying all the displayed output candidate images in a selected state when the detected area detected by the area detecting part is greater than or equal to a threshold and the detected area is not changed for more than a time limit.

10 Claims, 13 Drawing Sheets

IMAGE PROCESSING APPARATUS ON WHICH OUTPUT CANDIDATE IMAGES LESS THAN OR EQUAL TO A PREDETERMINED NUMBER ARE SELECTABLY DISPLAYED

INCORPORATION BY REFERENCE

This application is based on and claims the benefit of priority from Japanese Patent Application No. 2014-168336 filed on Aug. 21, 2014, and Japanese Patent Application No. 2015-038139 filed on Feb. 27, 2015, the entire contents of which are hereby incorporated by reference.

BACKGROUND

The present disclosure relates to an image processing apparatus, in particular, to a technology prompting a user to select output candidate images selectable as an image to be output using an indicator.

Conventionally, in an image processing apparatus equipped with a display part having a touch panel function, it has been known so far a technology which detects a movement of an indicator, such as a hand and a pen or the like by the touch panel function, and executes a predetermined action in accordance with the detected movement of the indicator.

The image processing apparatus of this kind includes, for example, a game machine having on its game board surface a plurality of detecting sensors by which a human body can be detected in a noncontact manner. The game machine detects a gesture by hand when the hand of a player crosses between specific two detecting sensors, and displays in mage indicative of an action corresponding to the gesture by hand.

SUMMARY

An image processing apparatus comprising a display part that has a display area on which each of a plurality of output candidate images less than or equal to a predetermined number is selectably displayed out of the plurality of output candidate images selectable by a user as an image to be output; a distance detecting part that detects a spatial distance between an indicator used by a user to select the output candidate images and the display area; an area detecting part that detects an area of a projection image of the indicator on the display area when the spatial distance detected by the distance detecting part is less than or equal to a predetermined first distance; and a selection control part that executes a first selection process for displaying all the output candidate images displayed on the display area in a selected state when the detected area detected by the area detecting part is greater than or equal to a predetermined threshold, and the detected area is not changed for more than a predetermined time limit.

DETAILED DESCRIPTION

Hereinafter, one embodiment of an image processing apparatus according to the present disclosure will be described with reference to the accompanying drawings. In this context, it should be noted that while the present disclosure will be described by giving an example of a multifunction printer as an image processing apparatus, the present disclosure is not intended to limit thereto, instead, for example, may be electronic devices on which various images are selectably displayed, such as a facsimile machine, a copy machine, a scanner, a printer, a tablet terminal, a smartphone, and a car navigation system or the like.

Figure 1:
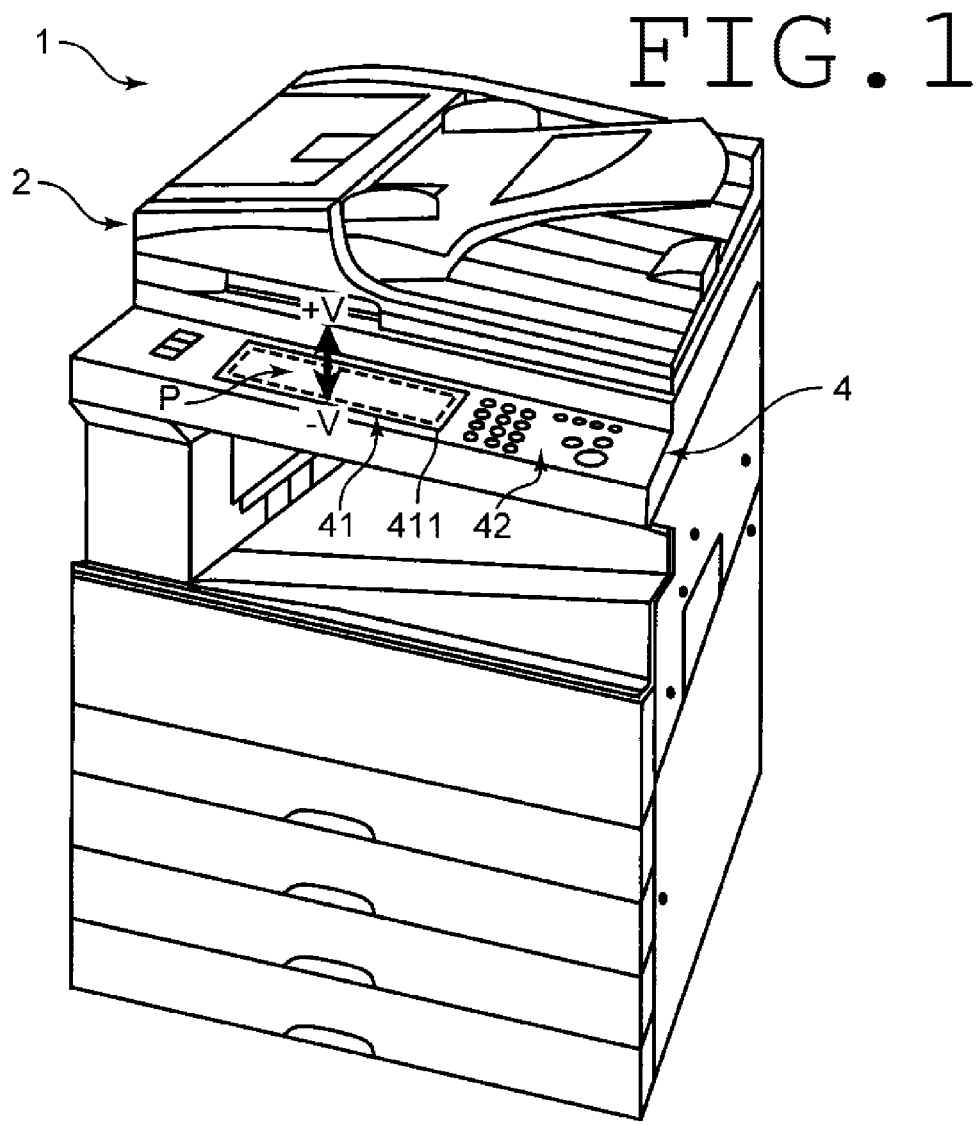
FIG. 1 is an outside drawing of a multifunction printer of one embodiment of an image processing apparatus according to the present disclosure.
Figure 2:
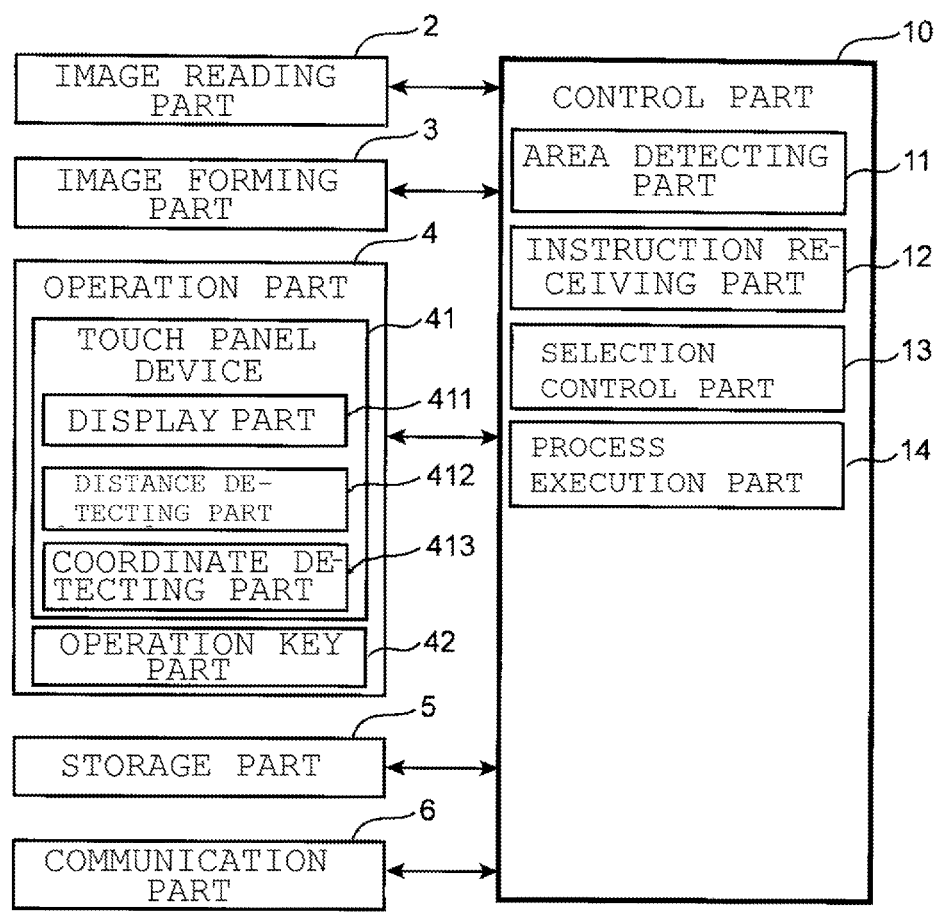
FIG. 2 is a block diagram showing an electrical configuration of the multifunction printer.

FIG. 1 is an outside drawing of a multifunction printer 1 of one embodiment of an image processing apparatus according to the present disclosure. FIG. 2 is a block diagram showing an electrical configuration of the multifunction printer 1. As shown in FIG. 1 and FIG. 2, the multifunction printer 1 includes an image reading part 2, an image forming part 3, an operation part 4, a memory part 5, a communication part 6, and a control part 10.

As shown in FIG. 1, the image reading part 2 is provided on an upper part of the multifunction printer 1. The image reading part 2 includes an optical system unit (not shown) having a CCD (Charge Coupled Device) line sensor and an exposure lamp or the like. The image reading part 2 causes the optical system unit to read an image of a document under the control of the control part 10, generates image data representative of the image of the document, and outputs the image data to the control part 10.

The image forming part 3 is provided inside the multifunction printer 1. The image forming part 3 forms an image on a paper based on the image data input to the control part 10 under the control of the control part 10. Specifically, the image forming part 3 has a widely known structure including a photosensitive drum, a charging part arranged opposing to a circumferential surface of the photosensitive drum, an exposure part positioned at the downstream side of the charging part and arranged opposing to the circumferential surface of the photosensitive drum, a developing part positioned at the downstream side of the exposure part and arranged opposing to the circumferential surface of the photosensitive drum, and a cleaning part positioned at the downstream side of the exposure part and arranged opposing to the circumferential surface of the photosensitive drum.

As shown in FIG. 1, the operation part 4 is provided at a front part of the multifunction printer 1. The operation part 4 is configured to be able to input various operation instructions by a user. Specifically, the operation part 4 is provided with a touch panel device 41 and an operation key part 42.

The touch panel device 41 is provided with a display part 411 made such as of a liquid crystal display or the like having a display part P to display an image. The display area P is composed of a plurality of pixels arranged in a lattice. The touch panel device 41 displays an image on the display area P by lightening each pixel on the display area P with brightness indicated by a pixel value of each pixel input by the control part 10 under the control of the control part 10. Further, the touch panel device 41 has a capacitance type touch panel function. The touch panel device 41 acts as a distance detecting part 412 and a coordinate detecting part 413 using the touch panel function.

Figure 3:
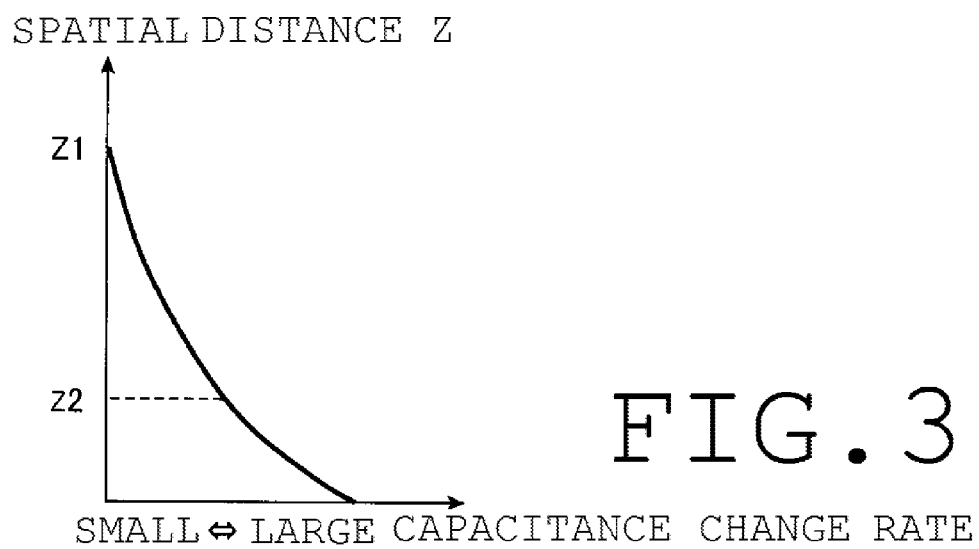
FIG. 3 is a graph showing a relationship between a spatial distance between an indicator and a display area and the magnitude of a change in capacitance on the display area.

FIG. 3 is a graph showing a relationship between a spatial distance Z between an indicator and the display area P and the magnitude of change in capacitance on the display area P. The spatial distance Z indicates a distance in a direction (a direction of arrow (±V direction) shown in FIG. 1)) orthogonal to the display area P. Hereinbelow, the direction orthogonal to the display area P (the direction of arrow (±V direction) shown in FIG. 1) shall be expressed as a vertical direction. Further, out of the vertical directions, a direction (-V direction) coming close to the display area P shall be expressed as a downward direction and a direction (+V direction) going away from the display area P shall be expressed as an upward direction.

A graph shown in FIG. 3 is previously determined based on an experimental value of a test run or the like, and is stored in a ROM (not shown) or the like provided inside the touch panel device 41. As shown in the graph of FIG. 3, when the spatial distance Z between the indicator such as a user's hand and a pen or the like and the display area P is less than or equal to a first distance Z1, the touch panel function of the touch panel device 41 can detect a change in capacitance changed on the display area P.

Upon detection of the magnitude of change in the capacitance changed on the display area P by the touch panel function, the distance detecting part 412 converts the magnitude of change in the detected capacitance into the spatial distance Z using the graph shown in FIG. 3 stored in the ROM or the like. Then, the distance detecting part 412 outputs a detection signal indicating the spatial distance Z to the control part 10. Thus, the distance detecting part 412 detects the spatial distance Z between the indicator and the display area P.

When the spatial distance Z is detected by the distance detecting part 412, that is, the spatial distance Z between the indicator and the display area P is less than or equal to the first distance Z1, the coordinate detecting part 413 outputs a detection signal indicating coordinates of a pixel where a change in capacitance is detected by the touch panel function to the control part 10 out of the plurality of pixels composing the display area P. Thus, when the spatial distance Z detected by the distance detecting part 412 is less than or equal to the first distance Z1, the coordinate detecting part 413 detects the coordinates of pixels composing a projection image of the indicator on the display area P.

Incidentally, the touch panel device 41 is not necessarily limited to the capacitance type touch panel function, rather the device 41 may, for example, have an ultrasonic system or an optical system touch panel function. Also, the touch panel device 41 may be designed to operate in the same way as the distance detecting part 412 and the coordinate detecting part 413 in accordance the system of the touch panel function.

The operation key part 42 includes, for example, various keys such as a ten key to input a numerical value and a symbol and an arrow key or the like to move a pointer (cursor) displayed on the display part 411.

The storage part 5 is a non-temporary recording medium. For example, the storage medium 5 stores images output in the past, as an electronic file, such as an image formed on a paper by the image forming part 3 and an image of a document indicated by image data output by the image reading part 2.

A user is allowed to make a selection of the images stored in the storage part 5 as an image to be output by various output processes using the operation part 4. The details of how to make a selection of the images stored in the storage part 5 by a user as an image to be output using the operation part 4 will follow later.

In this connection, the output processes include, for example, a print process, a transmission process, and a storage process or the like. The print process is a process for causing the image forming part 3 to form an image on a paper, and outputting the paper on which the image is formed. The transmission process is a process for converting an image into an electronic file, and transmitting (outputting) the electronic file to a designated destination using the communication part 6 to be described later. The storage process is a process for converting an image into an electronic file, and storing (outputting) the electric file to a designated folder. In this connection, the folder is previously reserved in the storage part 5, as an area to store the electronic file through an operation by a user.

The communication part 6 is a communication interface circuit for performing communication via a LAN (local Area Network) or the like between external devices such as a personal computer (not shown) and the control part 10.

The control part 10 is provided inside the multifunction printer 1. The control part 10 controls an operation of each part of the multifunction printer 1. Specifically, the control part 10 includes a CPU (Central Processing Unit) (not shown) for executing predetermined arithmetic processing, a non-volatile memory (not shown) such as an EEPRON or the like in which a predetermined control program is stored, a non-temporary recording medium (not shown) for temporarily storing data, a timer (not shown) for counting a current time, and peripheral circuits thereof or the like.

The control part 10 acts, for example, as an area detecting part 11, an instruction receiving part 12, a selection control part 13, and a process execution part 14 by executing the control program stored in the non-volatile memory or the like on the CPU.

When the spatial distance Z detected by the distance detecting part 412 is less than or equal to the first distance Z1, the area detecting part 11 calculates the total sum of an area of each pixel corresponding to each coordinate detected by the coordinate detecting part 413. Then, the area detecting part 11 takes the calculated total sum as an area of a projection image of the indicator on the display area P. Thus, when the spatial distance Z detected by the distance detecting part 412 is less than or equal to the first distance Z1, the area detecting part 11 detects an area of the projection image of the indicator on the display area P.

Figure 4:
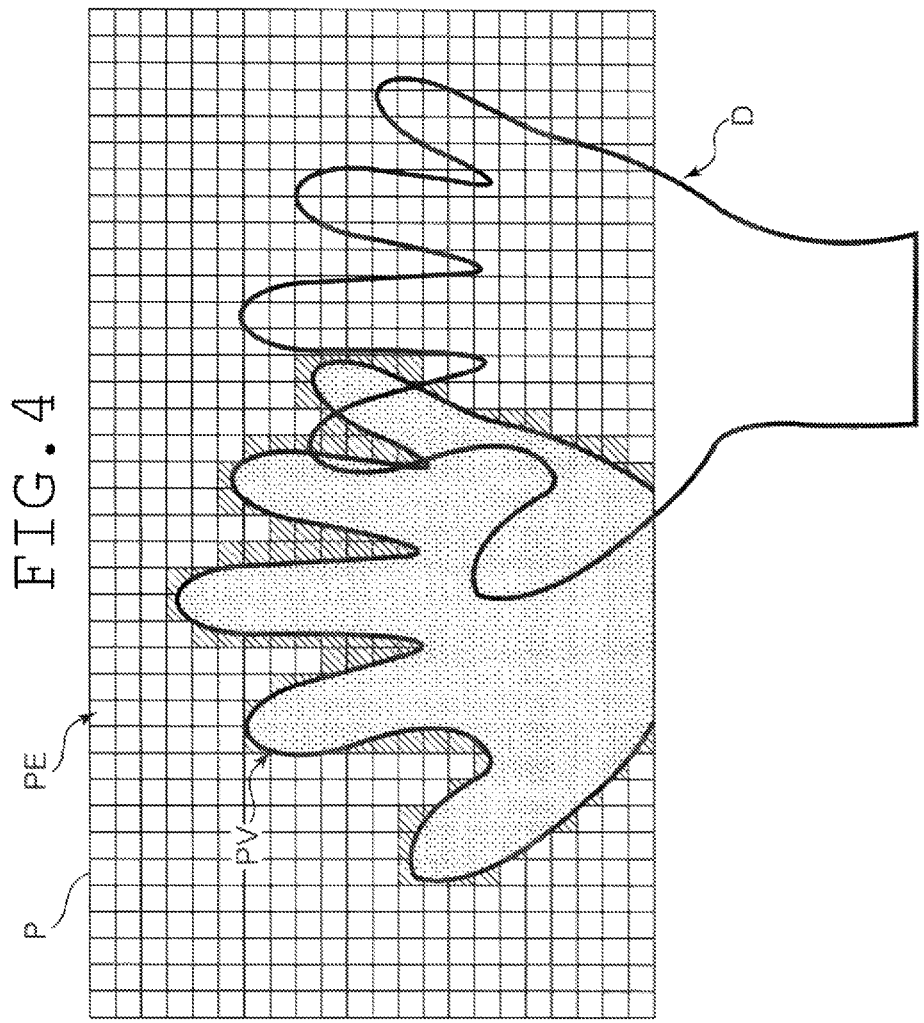
FIG. 4 is a drawing showing a projection image of an indicator on a display area.

FIG. 4 is a drawing showing a projection image PV of an indicator D on the display area P. In FIG. 4, the projection image of the indicator D on the display area P is illustrated as an area (gray area) denoted by a reference character PV of the indicator D when the indicator D comes closer to the display area P. Hereinbelow, the projection image of the indicator P on the display area P shall be expressed as the projection image PV of the indicator D.

In this connection, in FIG. 4, the indicator D is illustrated by greatly shifting intentionally toward a lower right in FIG. 4 than the projection image PV of the indicator D to clearly indicate the projection image PV of the indicator D. Further, in FIG. 4, each pixel P composing the display area PE is illustrated on a large scale than a full scale to clearly indicate an area of the projection image PV of the indicator D detected by the area detecting part 11.

Lets us suppose here that the spatial distance Z detected by the distance detecting part 412 goes below the first distance Z1, as a consequence of letting the indicator D come closer to the display area P. In this case, the coordinate detecting part 413 outputs a detection signal indicating coordinates of a pixel where a change in capacitance is detected by the touch panel function to the control part 10. In other words, in FIG. 4, the coordinate detecting part 413 outputs a pixel PE not shown due to overlapping of the projection image PV of the indicator D and a detection signal indicating the coordinates of the pixel PE indicated by a hatched line to the control part 10. Thus, when the spatial distance Z detected by the distance detecting part 412 is less than or equal to the first distance Z1, the coordinate detecting part 413 detects the coordinates of the pixels PE composing the projection image PV of the indicator D on the display area P.

Consequently, the area detecting part 11 calculates the total sum of an area of each pixel PE corresponding to each coordinate detected by the coordinate detecting part 413. Specifically, the area detecting part 11 calculates the total sum by calculating the product of the number of coordinates detected by the coordinate detecting part 413 and an area per pixel PE. In this connection, the area per pixel PE composing the display area P is previously stored in the non-volatile memory. Then, the area detecting part 11 detects the calculated total sum as an area of the projection image PV of the indicator D on the display area P.

Referring back to FIG. 2, the instruction receiving part 12 receives various instructions to the multifunction printer 1 input by an operation of the operation key part 42. Further, the instruction receiving part 12 receives various instructions to the multifunction printer 1 selected by a touch operation to bring the indicator D into contact with an image displayed on the display area P.

When the various instructions for the multifunction printer 1 are received by the latter method, the instruction receiving part 12 displays an operation screen in which one or more option images that are images prompting a user to select using the indicator D are arranged on the display area P. Then, lets us suppose here that when the operation screen is displayed on the display area P, the spatial distance Z detected by the distance detecting part 412 is less than or equal to a second distance Z2 (FIG. 3) shorter than the first distance Z1, as a consequence of letting the indicator D come closer to the option images by a user. The second distance Z2 indicates the spatial distance Z between the indicator D and the display area P when the indicator D contacts the display area P. In this case, the instruction receiving part 12 determines that a user brings the indictor D into contact with an option image displayed at a position of coordinates detected by the coordinate detecting part 413 to select the option image, and receives an instruction correlated with the option image.

Figure 5:
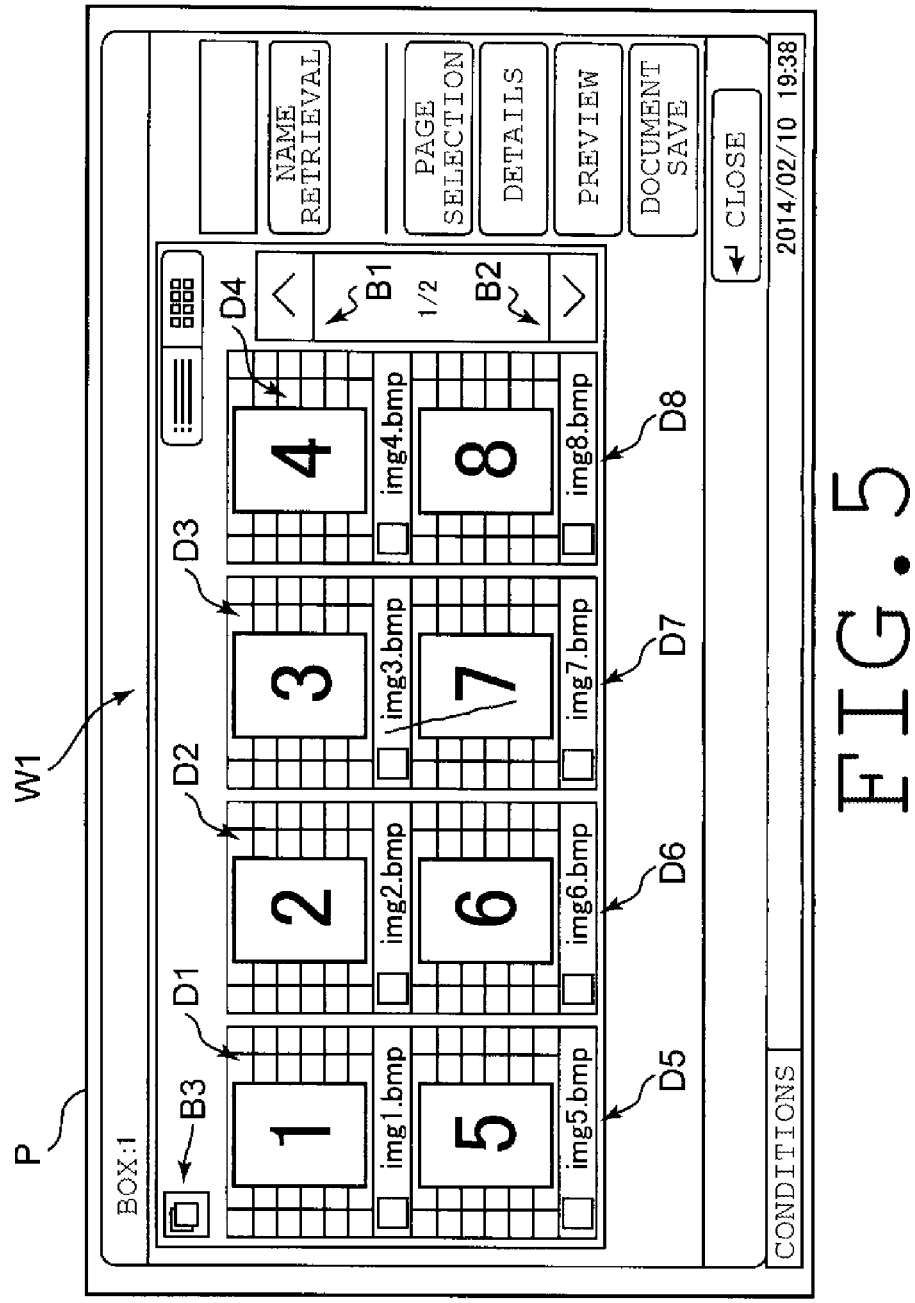
FIG. 5 is a drawing showing an operation screen displayed on a display area.

FIG. 5 is a drawing showing an operation screen W1 displayed on the display area P. For example, the instruction receiving part 12 displays the operation screen W1 shown in FIG. 5 on the display area P. The instruction receiving part 12 displays on the operation screen W1 option images D1 to D8 corresponding to output candidate images selectable by a user as images to be output. The option images corresponding to each output candidate image less than or equal to 8 (prescribed number) are displayed on the operation screen W1. The output candidate images are images output in the past stored in the above-mentioned storage part 5.

A description will be made in detail to the operation screen W1. The operation screen W1 includes the option images D1 to D8 of 8 or less, scroll buttons B1, B2, and a select-all check box B3.

The option images D1 to D8 are option images for prompting a user to select each of output candidate images stored in the storage part 5. Each option image D1 to D8 includes a thumbnail image that is a reduced image of each output candidate image, a check box indicating whether each output candidate image is selected or not, and an electronic file name indicating each output candidate image. Hereinbelow, the electronic filename indicating the output candidate images shall be expressed as an electronic file name of the output candidate images.

The scroll buttons B1, B2 are option images for prompting a user to select a scroll display instruction. The scroll display instruction is an instruction to cause option images corresponding to output candidate images different from the displayed output candidate images to display on the operation screen W1.

The select-all check box B3 is an option image for prompting a user to select a select-all instruction or a select-all release instruction. The select-all instruction is an instruction to bring all the output candidate images stored in the storage part 5 into a selected state, and to display all the output candidate images in a selected state. Meanwhile, the select-all release instruction is an instruction to bring all the selected output candidate images into an unselected state, and to display all the unselected output candidate images in an unselected state.

For example, lets us suppose here that when the operation screen W1 shown in FIG. 5 is displayed on the display area P, a user takes an index finger as the indicator D and the indicator D is moved in a downward direction to let the indicator D come closer to the option image D1, and consequently that the spatial distance Z detected by the distance detecting part 412 is less than or equal to the second distance Z2. In this case, the instruction receiving part 12 determines that the option image D1 is selected by a user, and receives a selective instruction for an output candidate image corresponding to the option image D1.

In this instance, the control part 10 brings the output candidate image corresponding to the option image D1 into a selected state following the selective instruction received by the instruction receiving part 12. Specifically, the control part 10 stores an electronic file name of the output candidate image corresponding to the option image D1 stored in the storage part 5 in the RAM. Thereby, the control part 10 brings the output candidate image corresponding to the option image D1 into a selected state.

Further, the control part 10 displays a check box in the option image D1 in a checked state in order for a user to visually recognize that the output candidate image corresponding to the option image D1 is in a selected state. Thereby, the control part 10 displays the output candidate image corresponding to the option image D1 on the display area P in a selected state.

Otherwise, lets us suppose here that a user takes an index finger as the indicator D and the indicator D is moved in a downward direction to let the indicator D come closer to the scroll button B2, and consequently that the spatial distance Z detected by the distance detecting part 412 is less than or equal to the second distance Z2. In this case, the instruction receiving part 12 determines that the scroll button B2 is selected by a user.

In this instance, the instruction receiving part 12 receives a scroll display instruction correlated with the scroll button B2. For example, lets us suppose here that the number of output candidate images stored in the storage part 5 is 15. In this case, the control part 10 acquires seven output candidate images different from eight output candidate images corresponding to the displayed eight option images D1 to D8 from the storage part 5 following the scroll display instruction received by the instruction receiving part 12. Then, the control part 10 displays the seven option images for prompting a user to select the seven output candidate images on the operation screen W1.

Lets us suppose here that while displaying the seven option images on the operation screen W1, a user takes an index finger as the indicator D and is moved in a downward direction to let the indicator D come closer to the scroll button B1, and consequently that the spatial distance Z detected by the distance detecting part 412 is less than or equal to the second distance Z2. In this case, the instruction receiving part 12 determines that the scroll button B1 is selected by a user.

In this instance, the instruction receiving part 12 receives a scroll display instruction correlated with the scroll button B1. In this case, the control part 10 redisplays the above-mentioned eight option images D1 to D8 different from the displayed seven option images following the scroll display instruction received by the instruction receiving part 12.

Otherwise, lets us suppose here that when the operation screen W1 shown in FIG. 5 is displayed on the display area P, a user takes an index finger as the indicator D and the indicator D is moved in a downward direction to let the indicator D come closer to the select-all check box B3, and consequently that the spatial distance Z detected by the distance detecting part 412 is less than or equal to the second distance Z2. In this case, the instruction receiving part 12 determines that the select-all check box B3 is selected by a user.

In this instance, the instruction receiving part 12 receives a select-all instruction correlated with the select-all check box B3. In this case, the control part 10 brings all the output candidate images stored in the storage part 5 into a selected state following the select-all instruction received by the instruction receiving part 12. Specifically, the control part 10 brings all the output candidate images stored in the storage part 5 into a selected state by storing an electronic file name of all the output candidate images stored in the storage part 5 in the RAM.

Figure 6:
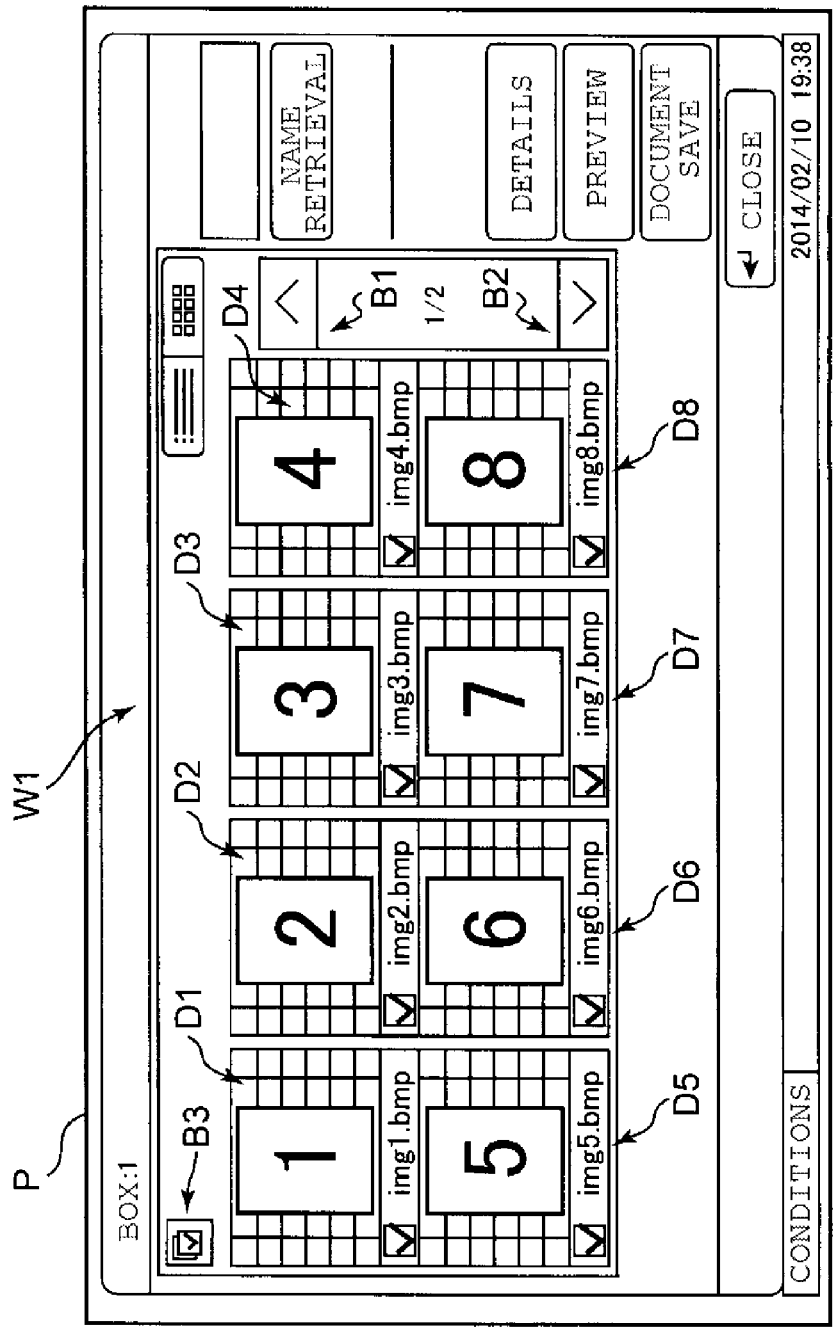
FIG. 6 is a drawing showing that all output candidate images are displayed on the operation screen in a selected state.

FIG. 6 is a drawing showing that all the output candidate images are displayed on the operation screen W1 in a selected state. As shown in FIG. 6, the control part 10 displays check boxes in all the option images D1 to D8 and the select-all check box B3 displayed on the display screen W1 in a checked state in order for a user to visually recognize that all the option candidate images are in a selected state.

As shown in FIG. 6, lets us suppose here that when the select-all check box B3 is displayed in a checked state, the instruction receiving part 12 receives scroll display instructions corresponding to the scroll buttons B1, B2. In this case, the control part 10 displays the check boxes in the option images of 8 or less displayed instead of the displayed option images of 8 or less following the scroll display instruction in a checked state. Thereby, the control part 10 displays all the selected output candidate images in a selected state.

Otherwise, as shown in FIG. 6, lets us suppose here that when the select-all check box B3 is displayed in a checked state, a user takes an index finger as the indicator D and the indicator D is moved in a downward direction to let the indicator D come closer to the select-all check box B3, and consequently that the spatial distance Z detected by the distance detecting part 412 is less than or equal to the second distance Z2.

In this case, the instruction receiving part 12 determines that the select-all check box B3 is selected by a user, and receives a select-all release instruction correlated with the select-all check box B3.

In this case, the control part 10 brings all the selected output candidate images into an unselected state following the select-all release instruction received by the instruction receiving part 12. Specifically, the control part 10 brings all the selected output candidate images into an unselected state by deleting an electronic file name of all the output candidate images stored in the RAM.

As shown in FIG. 5, the control part 10 brings check boxes in all the option images D1 to D8 and the select-all check box B3 displayed on the operation screen W1 into an unchecked state in order for a user to visually recognize that all the output candidate images are in an unselected state. Thereby, the control part 10 displays all the unselected output candidate images in an unselected state.

Referring back to FIG. 2, when a prescribed condition is met during the execution of a first selection process and a second selection process to be described later by the selection control part 13, the instruction receiving part 12 receives an instruction to output candidate images displayed on the display area P at least in a selected state out of all the output candidate images stored in the storage part 5. The details of how to receive the instruction by the instruction receiving part 12 at this moment will follow later. Also, the details of the selection control part 13 and the process execution part 14 will follow later.

Hereinbelow, a description will be made to an operation when the indicator D comes closer to the display area P. In the description, the details of the selection control part 13 and the process execution part 14 will be described. Further, in the description, a receiving operation of the instruction receiving part 12 to be performed during the execution of the first selection process and the second selection process will also be described.

Figure 7:
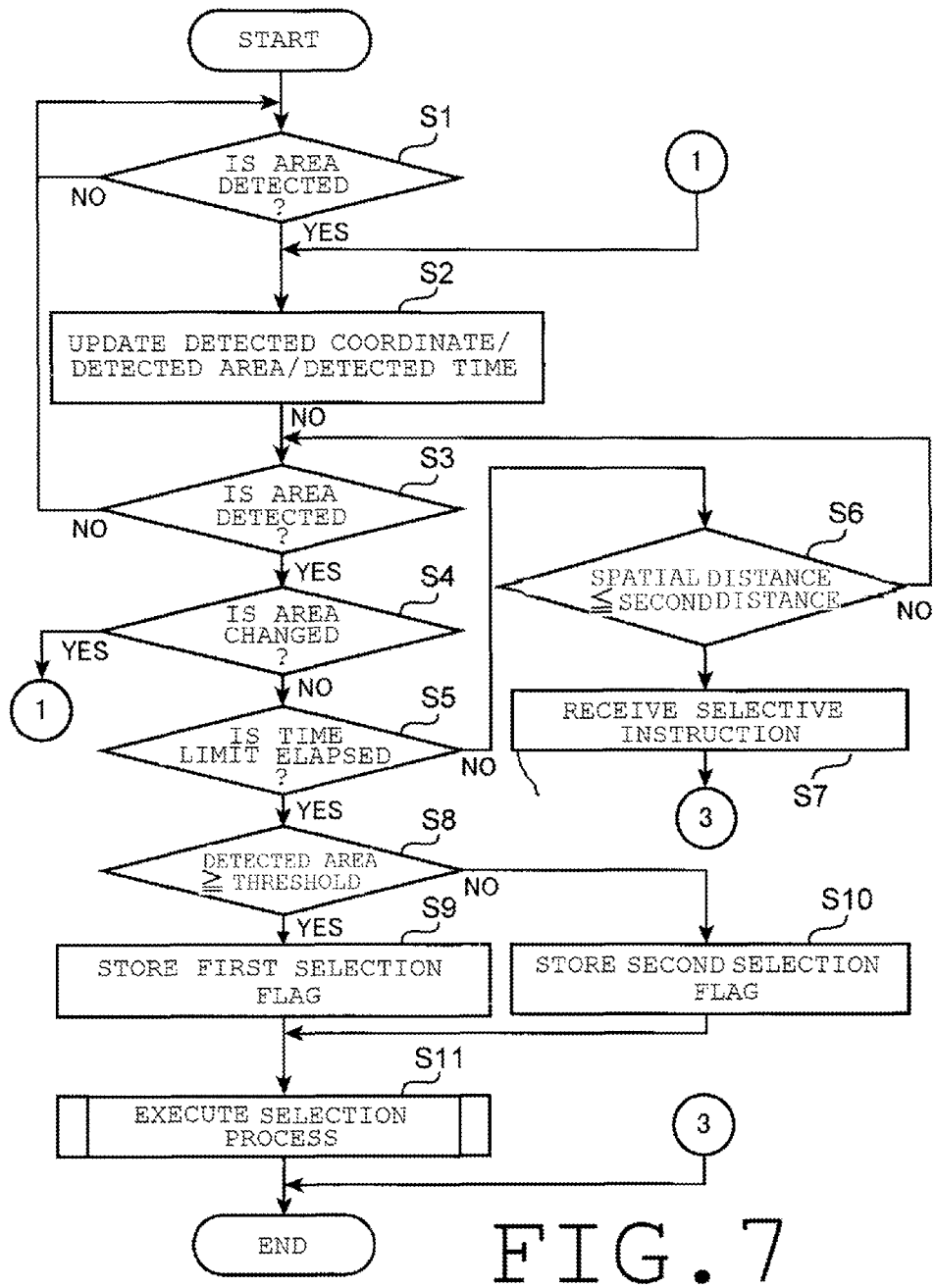
FIG. 7 is a flowchart showing a movement when an indicator comes closer to a display area.
Figure 8:
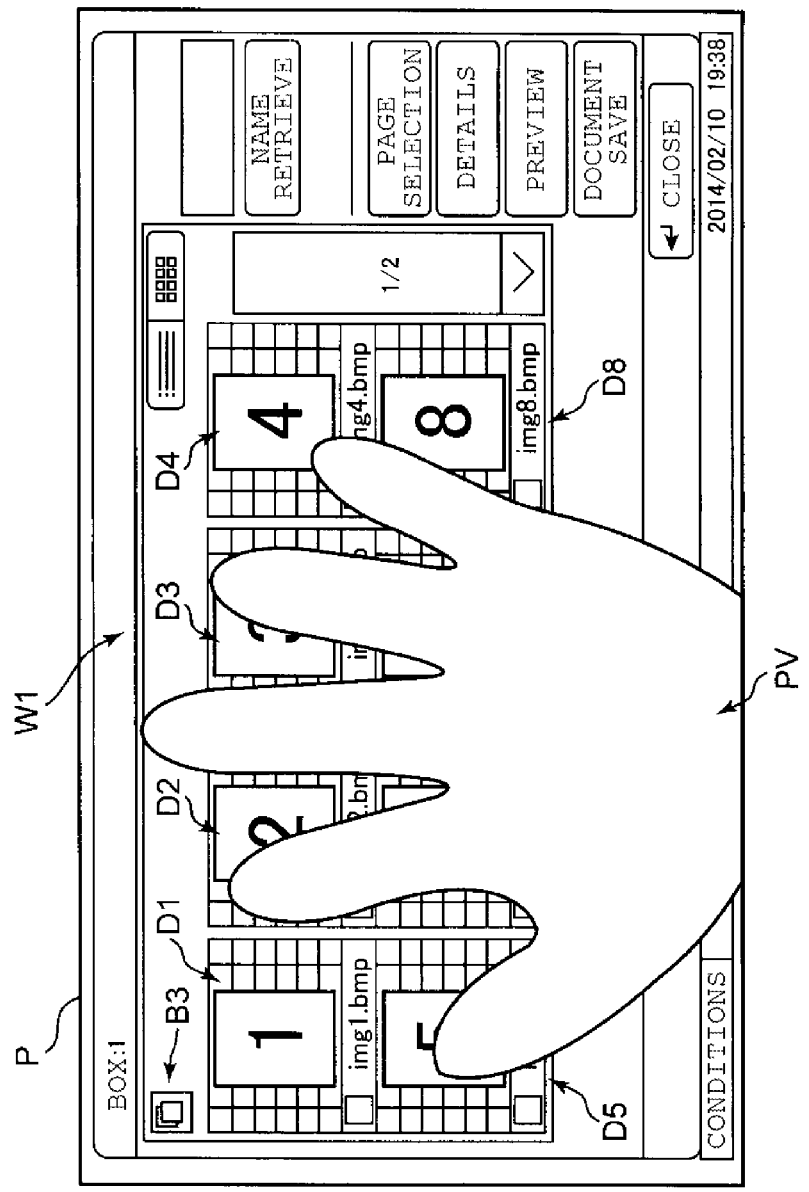
FIG. 8 is a drawing showing an example of a projection image of an indicator when the indicator comes closer to a display area if the indicator is a palm.

Hereinbelow, a description will be made to an operation as a specific example when the indicator D comes closer to the display area P where the operation screen W1 shown in FIG. 5 is displayed on the display area P. FIG. 7 is a flow chart showing an operation when the indicator D comes closer to the display area P. FIG. 8 is a drawing showing an example of the projection image PV of the indicator D when the indicator D comes closer to the display area P if the indicator D is a palm.

Lets us suppose here that when the operation screen W1 shown in FIG. 5 is displayed on the display area P, a user takes a palm as the indicator D and moves the indicator D in a downward direction to let the indicator D come closer to the display area P, and consequently that the spatial distance Z detected by the distance detecting part 412 is less than or equal to the first distance Z1.

In this case, the coordinate detecting part 413 detects coordinates of pixels composing the projection image PV of the indicator D shown in FIG. 8. As a result, as shown in FIG. 7, the area detecting part 11 detects an area of the projection image PV of the indicator D (S1; YES) based on the coordinates of the pixels composing the projection image PV of the indicator D detected by the coordinate detecting part 413. Hereinbelow, the coordinates of the pixels composing the projection image PV of the indicator D detected by the coordinate detecting part 413 shall be expressed as detected coordinates. Further, an area of the projection image PV of the indicator D detected by the area detecting part 11 shall be expressed as a detected area.

In this instance, the selection control part 13 acquires a current time using a timer inside the control part 10. Then, the selection control part 13 takes the acquired current time as a detected time at which the detected area is detected in step S1. Then, the selection control part 13 stores the detected coordinates, the detected area, and the detected time in the RAM (S2).

Lets us suppose here that after the execution of step S2, the spatial distance Z between the indicator D and the display area P becomes longer than the first distance Z1, as a consequence of movement of the indicator D in an upward direction by a user. In this case, the coordinates of pixels composing the projection image PV of the indicator D result in not being detected by the coordinate detecting part 413. Due to this, the are detecting part 11 is precluded from detecting an area of the projection image PV of the indicator D (S3; NO). In this case, processes subsequent to step S1 will be repeated.

Meanwhile, lets us suppose here that after the execution of step S2, the projection image PV of the indicator D is changed due to a change of the indicator D by a user from a palm to a finger or the like. In this case, coordinates composing the changed projection image PV of the indicator D are detected by the coordinate detecting part 413. As a result, an area of the projection image PV of the changed indicator D is detected by the area detecting part 11 (S3; YES), and the detected area after a change of the projection image PV differs from the detected data stored in the RAM. In this case, the selection control part 13 determines that the detected area is changed (S4; YES), and reexecutes step 2.

In this connection, in step S2 in which the process is executed in a state where the detected coordinates, the detected area and detected time are stored in the RAM, the detected coordinates stored in the RAM are updated with the coordinates detected by the coordinate detecting part 413 in step S1 or in step S3. Similarly, the selection control part 13 updates the detected area stored in the RAM with an area of the projection image PV of the indicator D detected in step S1 or in step S3. Further, the control selection part 13 acquires a current time using a timer inside the control part 10, and takes the acquired current time as a detected time at which the detected area is detected in step S1 or in step S3. Then, the selection control part 13 updates the detected time stored in the RAM with the detected time.

Otherwise, lets us suppose here that after the execution of step S2, a user does not perform an action of changing the indicator D such as by changing a state of hand. In this case, coordinates of pixels composing the projection image PV of the indicator D are detected by the coordinate detecting part 413, and an area of the projection image PV of the indicator D is detected by the area detecting part 11 (S3; YES). In this case, since the indicator D is not changed, the detected area detected in step S3 becomes equal to the detected data stored in the RAM. In this case, the selection control part 13 determines that the detected area is not changed (S4; NO).

In this instance (S4; NO), the selection control part 13 acquires a current time using a timer inside the control part 10, and determines whether the acquired current time is a point of time or not after a predetermined time limit has elapsed since the detected time stored in the RAM (S5). In other words, the selection control part 13 determines whether the predetermined time limit has elapsed or not in a state where the detected area is not changed in step S4 or in step S5.

Incidentally, the time limit is set to a time (for example, 2 sec or so) longer than a time (for example, 0.5 sec or so) required to further move the indicator D in a downward direction from a point of time at which the indicator D is moved to an upper part of an option image to be selected by a user, and is previously stored in a non-volatile memory inside the control part 10.

Then, lets us suppose here that after the selection control part 13 determines that the predetermined time limit has not yet elapsed in a state where the detected area is not changed (S4; NO, S5; NO), the spatial distance Z detected by the distance detecting part 412 is less than or equal to the second distance Z2 (S6; YES).

In this case, as stated above, the instruction receiving part 12 determines that an option image displayed at a position of the detected coordinates stored in the RAM is selected, and receives an instruction correlated with the option image (S7). As a result, the control part 10 activates the multifunction printer 1 following the instruction received in step S7, and terminates an operation shown in FIG. 7. In this connection, at the time of terminating the operation shown in FIG. 7, the control part 10 deletes the detected coordinates, the detected area, and the detected time stored in the RAM.

For example, lets us suppose here that when the operation screen W1 shown in FIG. 5 is displayed on the display area P, as shown in FIG. 8, a user takes a palm as the indicator D to let the indicator D come closer to the display area P, and then immediately moves the indicator D in a downward direction, and consequently that step S7 is executed.

In this case, the instruction receiving part 12 determines in step S7 that the seven option images D2 to D8 where the projection image PV of the indicator D composed of pixels corresponding to the detected coordinates stored in the RAM is overlapped are selected. Then, the instruction receiving part 12 receives a selective instruction for seven output candidate images corresponding to the seven option images D2 to D8.

Consequently, the control part 10 brings the seven output candidate images corresponding to the seven option images D2 to D8 into a selected state following the selective instruction received by the instruction receiving part 12, and displays the seven output candidate images in a selected state. Specifically, the control part 10 stores an electronic file name of the seven output candidate images corresponding to the seven option images D2 to D8 in the RAM, and displays check boxes in the seven option images D2 to D8 in a checked state.

Referring back to FIG. 7, if the selection control part 13 determines that a predetermined time limit has elapsed in a state where the detected area is not changed (S4; No, S5; YES), the selection control part 13 determines whether the detected area stored in the RAM is greater than or equal to a predetermined threshold or not (S8). In this connection, for example, the threshold is set to an area or so equal to an area of human's palm, and is previously stored in a non-volatile memory inside the control part 10.

If the selection control part 13 determines in step S8 that the detected area is greater than or equal to the predetermined threshold (S8; YES), the selection control part 13 stores a first selection process flag in the RAM (S9). The first selection process flag is information such as a numerical value (for example, 1) or the like indicating that a first selection process to be described later is executed. Otherwise, if the selection control part 13 determines in step S8 that the detected area is not greater than or equal to the predetermined threshold (less than the threshold) (S8; NO), the selection control part 13 stores a second selection process flag in the RAM (S10). In this connection, the second selection process flag is information such as a numerical value (for example, 2) or the like indicating that a second selection process to be described later is executed.

After the execution of step S9 or step S10, the selection control part 13 executes the first selection process or the second selection process (S11). Hereinbelow, when the first selection process and the second selection process are collectively described, they shall be expressed as a selection process.

Figure 9:
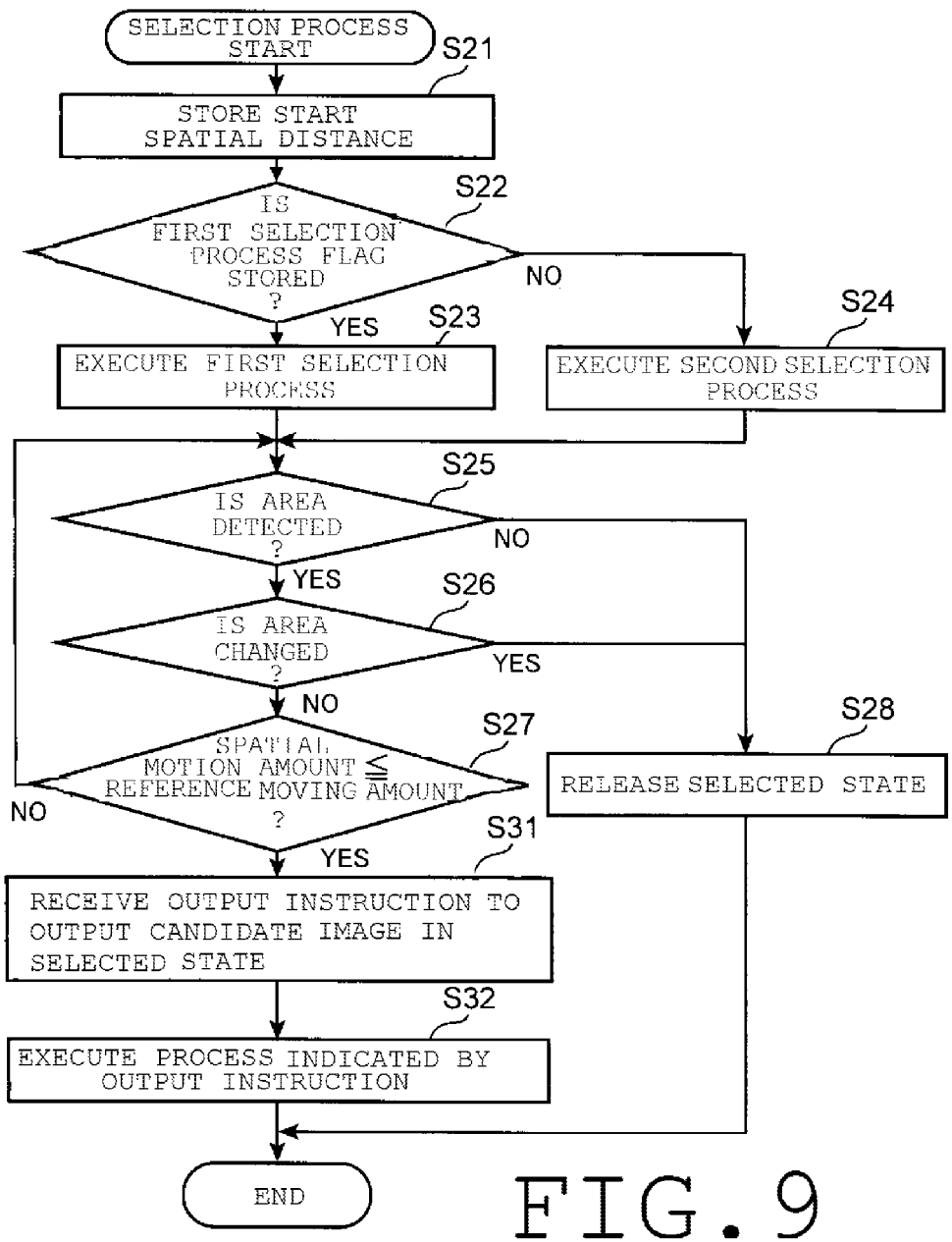
FIG. 9 is a flowchart showing an operation of a selecting process.

FIG. 9 is a flow chart showing an operation of the selection process. As shown in FIG. 9, when the selection control part 13 starts an execution of the selection process, the selection control part 13 stores the spatial distance Z detected by the distance detecting part 412 in the RAM as a start spatial distance (S21).

If the first selection process flag is stored in the RAM (S22; YES), the selection control part 13 executes the first selection process (S23). In this connection, the first selection process is a process for bringing all the output candidate images into a selected state, and displaying all the selected output candidate images on the display area P in a selected state.

For example, lets us suppose here that when the operation screen W1 shown in FIG. 5 is displayed on the display area P, as shown in FIG. 8, a user takes a palm as the indicator D, and a time limit has elapsed while keeping the indicator D close to the display area P. Further, lets us suppose here that the detected area that is an area of the projection image PV of the indicator D is greater than or equal to a threshold, and consequently that the selection control part 13 executes the first selection process in step S23. Hereinbelow, fifteen output candidate images shall be stored in the storage part 5.

In the first selection process, the selection control part 13 brings all the output candidate images stored in the storage part 5 into a selected state as with a case where the above-mentioned instruction receiving part 12 receives a select-all instruction. Specifically, the selection control part 13 brings the fifteen output candidate images into a selected state by storing an electronic file name of the fifteen output candidate images stored in the storage part 5 in the RAM.

Further, in the first selection process, as shown in FIG. 6, the selection control part 13 displays check boxes and the select-all check box B3 in all the option images D1 to D8 displayed on the operation screen W1 in a checked state in order for a user to visually recognize that all the output candidate images are selected. Thereby, the selection control part 13 displays on the display area P output candidate images corresponding to all the option images D1 to D8 displayed on the display area P in a selected state.

Meanwhile, if the second selection process flag is stored in the RAM (S22; NO), the selection control part 13 executes the second selection process (S24). In this connection, the second selection process is a process for bringing only output candidate images corresponding to option images whose projection image PV of the indicator D is overlapped into a selected state, and displaying only the selected output candidate image on the display area P in a selected state.

Figure 10:
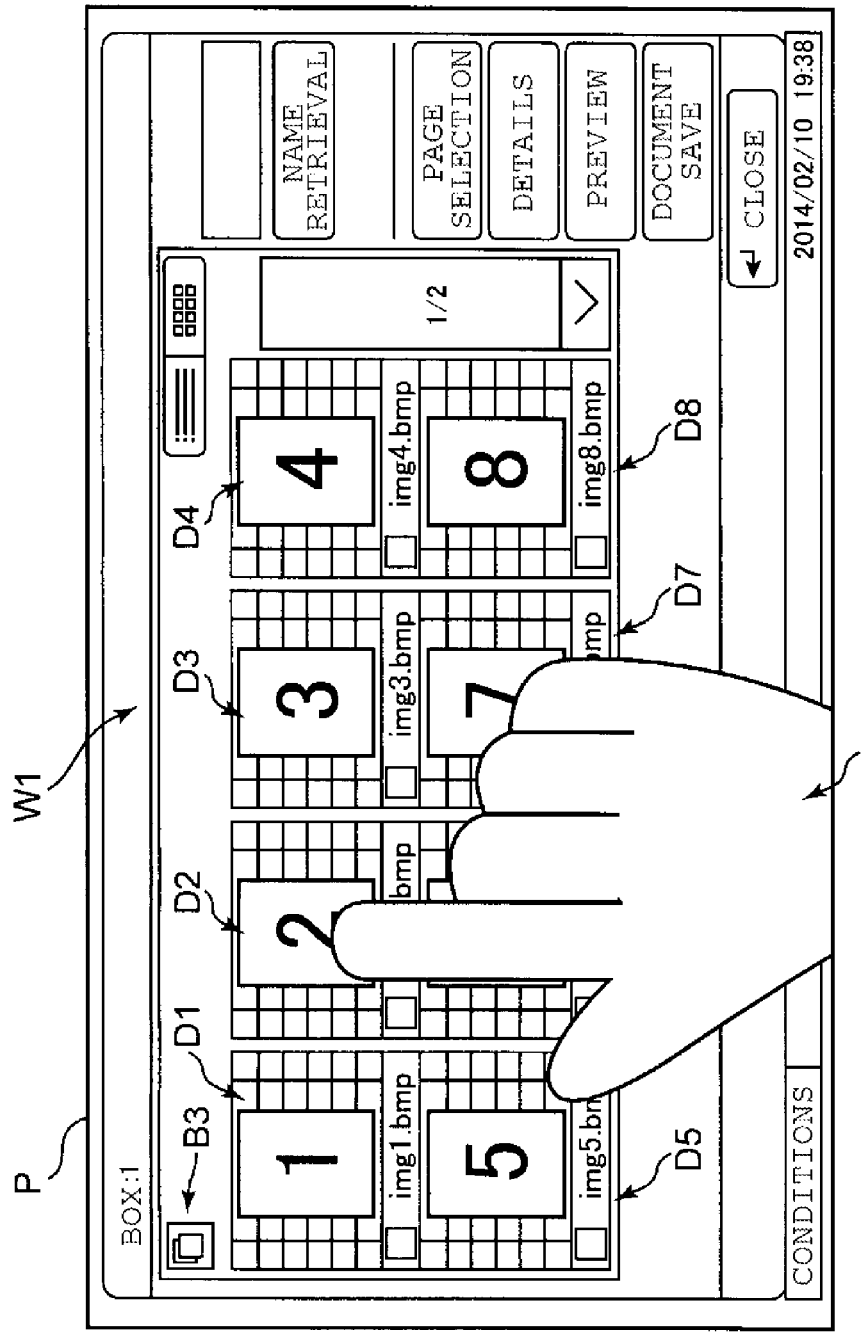
FIG. 10 is a drawing showing an example of a projection image of an indicator when the indicator comes closer to a display area if the indicator is a hand pointing by an index finger.
Figure 11:
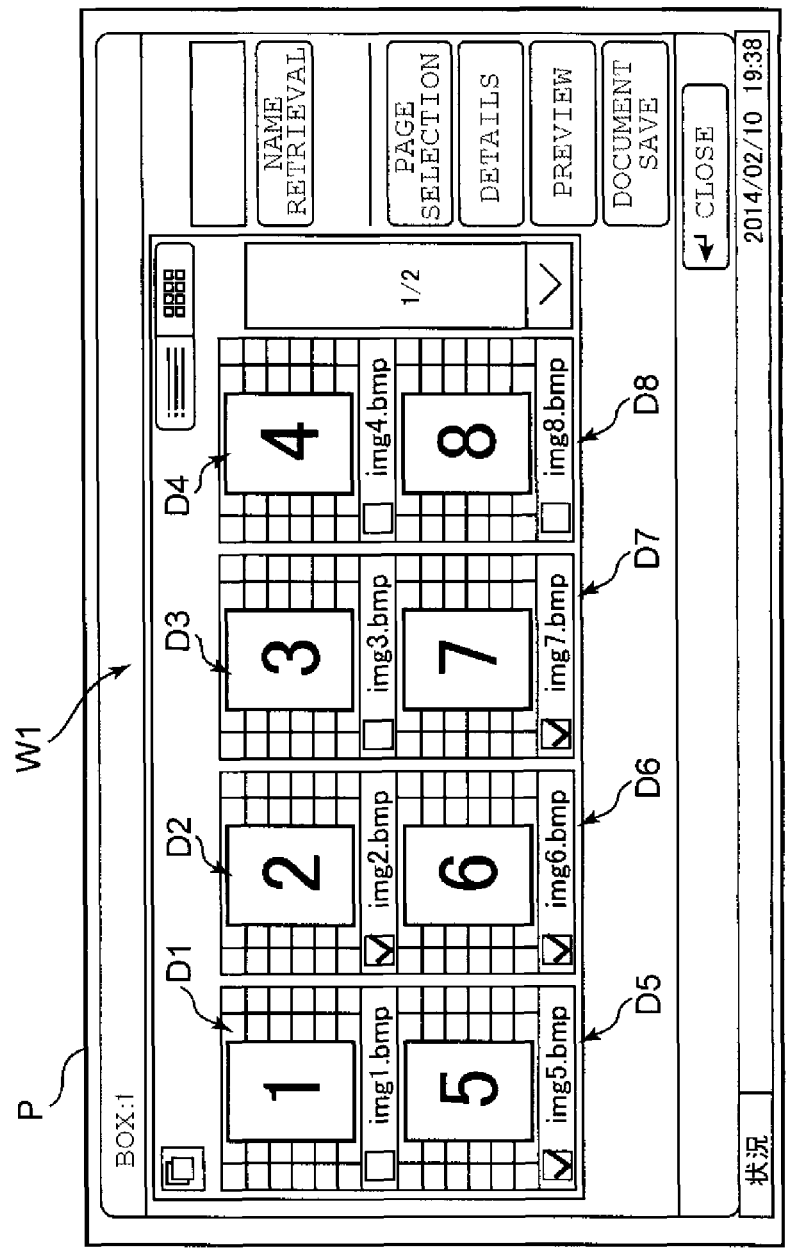
FIG. 11 is a drawing showing an operation screen when a second selection process is executed.

FIG. 10 is a drawing showing an example of the projection image PV of the indicator D when the indicator D comes closer to the display area P where the indicator D is a hand pointing by an index finger. FIG. 11 is a drawing showing the operation screen W1 when the second selection process is executed. For example, lets us suppose here that when the operation screen W1 shown in FIG. 5 is displayed on the display area P, as shown in FIG. 10, a hand pointing by a user's index finger is taken as the indicator D and a time limit has elapsed while keeping the indicator D close to the display area P. Further, lets us suppose here that the detected area that is an area of the projection image PV of the indicator D is less than a threshold, and consequently that the selection control part 13 executes the second selection process in step S24.

In the second selection process, the selection control part 13 acquires the detected coordinates stored in the RAM. Then, the selection control part 13 stores an electronic file name of four output candidate images stored in the storage part 5 corresponding to the four option images D2, D5 to D7 containing pixels corresponding to the acquired detected coordinates. Thereby, the selection control part 13 brings only the four output candidate images corresponding to the four option images D2, D5 to D7 where the projection image PV of the indicator D composed of pixels corresponding to the detected coordinates is overlapped into a selected state.

Further, in the second selection process, as shown in FIG. 11, the selection control part 13 displays check boxes in the four option images D2, D5 to D7 in a checked state in order for a user to visually recognize that the four output candidate images are selected. Thereby, the selection control part 13 displays only the selected four output candidate images on the display area P in a selected state.

Then, lets us suppose here that during the execution of the first selection process and the second selection process, the spatial distance Z between the indicator D and the display area P becomes longer than the first distance Z1 as a consequence of movement of the indicator D in an upward direction by a user. In this case, coordinates of pixels composing the projection image PV of the indicator P result in not being detected by the coordinate detecting part 413. Thereby, the area detecting part 11 is precluded from detecting an area of the projection image PV of the indicator D (S25; NO).

In this case, the selection control part 13 brings all the selected output candidate images into an unselected state, and displays all the unselected output candidate images in an unselected state (S28). Then, the selection control part 13 terminates an execution of the first selection process and the second selection process. In this connection, when the execution of the first selection process and the second selection process are terminated, the selection control part 13 deletes information of the detected area or the like stored in the RAM.

Meanwhile, lets us suppose here that during the execution of the first selection process and the second selection process, the projection image PV of the indicator D is changed due to a change in a state of a user's hand. In this case, coordinates consisting the projection image PV of the indicator D after a change of the indicator D are detected by the coordinate detecting part 413. As a result, an area of the changed projection image PV of the indicator D is detected by the area detecting part 11 (S25; YES), and a detected area after a change of the indicator D differs from the detected data stored in the RAM. In this case, the selection control part 13 determines that the detected area is changed (S26; YES). Even in this case, the selection control part 13 executes step S28, and terminates an execution of the first selection process or the second selection process.

Hereinbelow, a description will be made in detail to step S28. For example, lets us suppose here that during the execution of the first selection process (S23) shown in the above-mentioned specific example, step S28 is executed. In step S28, the selection control part 13 brings all the selected output candidate images into an unselected state, as with a case where a select-all release instruction is received by the above-mentioned instruction receiving part 12. Specifically, the selection control part 13 brings all the output candidate images into an unselected state by deleting an electronic file name of all the selected output candidate images (15 images) stored in the RAM.

Further, in step S28, as shown in FIG. 5, the selection control part 13 displays check boxes in all the option images D1 to D8 and the select-all check box B3 displayed on the operation screen W1 in an unchecked state in order for a user to visually recognize that all the output candidate images are not selected. Thereby, the selection control part 13 displays all the unselected output candidate images in an unselected state.

Meanwhile, lets us suppose here that during the execution of the second selection process (S24) shown in the above-mentioned specific example, step S28 is executed. In step S28, the selection control part 13 brings four output candidate images corresponding to the selected four option images D2, D5 to D7 into an unselected state. Specifically, the selection control part 13 brings the four output candidate images into an unselected state by deleting an electronic file name of the selected four output candidate images stored in the RAM.

Further, as shown in FIG. 5, the selection control part 13 displays check boxes in the four option images D2, D5 to D7 corresponding to the four output candidate images displayed on the operation screen W1 in order for a user to visually recognize that the four output candidate images are not selected. Thereby, the selection control part 13 displays the unselected four output candidate images in an unselected state.

Referring back to FIG. 9, lets us suppose here that during the execution of the first selection process or the second selection process, a user does not perform an action of changing the indicator D such as by changing a state of hand or the like. In this case, coordinates of pixels composing the projection image PV of the indicator D are detected by the coordinate detecting part 413 and an area of the projection image PV of the indicator D is detected by the area detecting part 11 (S25; YES). In this case, since the indicator D is not changed, the detected area detected in step S25 becomes equal to the detected area stored in the RAM. In this instance, the selection control part 13 determines that the detected area is not changed (S26; NO).

In this case (S26; NO), the instruction receiving part 12 determines whether a spatial moving amount obtained by subtracting a start spatial distance stored in the RAM from the spatial distance Z detected by the distance detecting part 412 is less than or equal to a predetermined reference moving amount (S27).

Specifically, in step S27, the instruction receiving part 12 acquires the start spatial distance stored in the RAM. Then, the instruction receiving part 12 subtracts the acquired start spatial distance from the spatial distance Z detected by the distance detecting part 412. Then, the instruction receiving part 12 takes a subtracted result as a spatial moving amount where the indicator D moves in a vertical direction from an execution start time of the first selection process or the second selection process. Subsequently, the instruction receiving part 12 determines whether the calculated spatial moving amount is less than or equal to the predetermined reference moving amount or not. In this connection, the reference moving amount is, for example, set to 0, and is stored in a non-volatile memory.

For example, lets us suppose here that during the execution of the first selection process or the second selection process, a user moves the indicator D in an upward direction without changing the indicator D, and that step S27 is then executed. In this case, since the indicator D is kept away from the display area P, as compared with an execution start of the first selection process or the second selection process, the spatial distance Z detected by the distance detecting part 412 becomes longer than the above-mentioned start spatial distance. On this account, the spatial moving amount obtained by subtracting the above-mentioned start spatial distance from the spatial distance Z is a positive value.

In other words, in step S27, the instruction receiving part 12 determines that the calculated spatial moving amount is greater than the reference moving amount (S27; NO). In this case, processes subsequent to step S25 are repeated.

Meanwhile, lets us suppose here that during the execution of the first selection process or the second selection process, a user moves the indicator D in a downward direction without changing the indicator D, and step S27 is then executed. In this case, since the indicator D is kept closer to the display area P, as compared with an execution start of the first selection process or the second selection process, the spatial distance Z detected by the distance detecting part 412 becomes shorter than the start spatial distance. On this account, a spatial moving amount obtained by subtracting the start spatial distance from the spatial distance Z is a negative value.

Namely, in step S27, the instruction receiving part 12 determines that the calculated spatial moving amount is less than or equal to the reference moving amount (S27; YES). In this case, the instruction receiving part 12 receives an instruction to output a selected output candidate image (S31). In this connection, the reference moving amount may be set to a negative value, not necessarily limited to 0.

Hereinbelow, a description will be made in detail to step S31. For example, lets us suppose here that during the execution of the first selection process (S23) shown in the above-mentioned specific example, step S31 is executed. In other words, in this case, fifteen output candidate images are in a selected state. Accordingly, in step S31, the instruction receiving part 12 receives an instruction to output the selected fifteen output candidate images. Thus, the instruction receiving part 12 receives an instruction to output all the output candidate images stored in the storage part 5 in step S31 to be executed during the execution of the first selection process.

Meanwhile, lets us suppose here that during the execution of the second selection process (S24) shown in the above-mentioned specific example, step S31 is executed. Namely, in this case, four output candidate images corresponding to the four option images D2, D5 to D7 are in a selected state. Further, as shown in FIG. 11, check boxes in the four option images D2, D5 to D7 are displayed in a checked state. In other words, the four output candidate images corresponding to the four option images D2, D5 to D7 are displayed on the display area P in a selected state.

In step S31, the instruction receiving part 12 receives an instruction to output the four output candidate images corresponding to the selected four option images D2, D5 to D7. Thus, the instruction receiving part 12 receives in step S31 to be performed during the execution of the second selection process an instruction to output the output candidate images displayed on the display area P in a selected state out of the plurality of output candidate images stored in the storage area 5 to be executed during the execution of the second selection process.

In step S31, upon reception of an instruction to output the selected output candidate image (S31), the process execution part 14 executes a predetermined output process for outputting the output candidate image to be output indicated by the instruction (S32). The predetermined output process to be executed by the process execution part 14 in step S32 is previously determined to be one, and is stored in a non-volatile memory.

For example, if the predetermined output process is a print process, the process execution part 14 acquires in step S32 output candidate images to be output indicated by an instruction received in step S31 from the storage part 5. Then, the process execution part 14 causes the image forming part 3 to form output candidate images on a paper under prescribed print conditions.

Incidentally, the print conditions include a paper number (number of copy) on which an image is formed and a paper size or the like. The prescribed print conditions are stored in a non-volatile memory. The prescribed print conditions also include a print condition (for example, number of copy "1" and a paper size "A4" or the like) required at least for forming an image on a paper by the image forming part 3.

If the predetermined output process is a transmission process, the process execution part 14 acquires in step 32 output candidate images to be output indicated by an instruction received in step S31 from the memory part 5. Then, the process execution part 14 acquires an electronic file indicating the acquired output candidate image from the memory part 5, and transmits (outputs) the electronic file to a destination specified by predetermined transmission conditions through the communication part 6.

Incidentally, the transmission conditions include a destination condition or the like indicating a destination of the electronic file. The predetermined transmission conditions are set in a non-volatile memory. The predetermined transmission conditions also include a transmission condition (for example, a destination condition "xxx, xxx, xxx, xxx (IP address of file server)") required at least for transmitting the electronic file through the transmission part 6.

If the predetermined output process is a storage process, the process execution part 14 acquires in step S32 output candidate images to be output indicated by an instruction received in step S31 from the storage part 5. Then, the process execution part 14 acquires an electronic file indicating the acquired output candidate image from the memory part 5, and stores (outputs) the electronic file to a folder indicated by prescribed storage conditions.

Incidentally, the storage conditions include a folder condition or the like indicating a folder that is a storage destination of the electronic file. The prescribed storage conditions are set in a non-volatile memory. The prescribed storage conditions include a storage condition (for example, a folder condition "/DefaultFileFolder (a path name indicating a default folder to store an electronic file)") required at least for storing the electronic file.

Thus, if the detected area detected by the area detecting part 11 is greater than or equal to a predetermined threshold, and the detected area is not changed for more than a predetermined time limit (S4; NO, S5; YES, S8; YES), the selection control part 13 executes the first selection process (S9, S11, S22; YES, S23). The selection control part 13 brings all the output candidate images stored in the storage part 5 into a selected state in the first selection process, and displays all the selected output candidate images on the display area P in a selected state.

If a spatial moving amount obtained by subtracting the spatial distance Z (start spatial distance) detected by the distance detecting part 412 at the time of starting an execution of the first selection process from the spatial distance Z detected by the distance detecting part 412 in the first selection process is less than or equal to the predetermined reference moving amount (S23, S25; YES, S26; NO, S27; YES), an instruction to output all the output candidate images stored in the storage area 5 is received (S31).

For this reason, a user enables all the output candidate images stored in the storage part 5 to bring into a selected state as an image to be output only by waiting for a time limit while keeping the indicator D having an area greater than or equal to a threshold close to the display area P. Then, a user enables an instruction to output all the selected output candidate images to be received by the instruction receiving part 12 merely by further letting the indicator D come closer to the display area P.

In other words, a user allows an instruction to output all the output candidate images stored in the storage area 5 to be received by the instruction receiving part 12 merely by taking a palm as the indicator D, by setting an area of the indicator D to a value greater than or equal to a threshold, and by waiting for a time limit while keeping the indictor D close to the display area P, followed by performing an operation of further letting the indicator D come closer to the display area P.

Consequently, even in either case where a user takes a thing having a small area such as a finger and a pen or the like as the indicator D, or a user takes a thing having a large area such as a palm or the like as the indicator D, the present embodiment enables operability of an operation performed by a user using the indicator D to be improved, as compared with a case where an operation to be performed when the indicator D comes closer to the indicator D is the same.

If the detected area is less than a threshold, and the detected area is not changed for more than a predetermined time limit (S4; NO, S5; YES, S8; NO), the selection control part 13 executes the second selection process (S10, S11, S22; NO, S24). In the second selection process, the selection control part 13 brings only output candidate images corresponding to option images whose projection image PV of the indicator D is overlapped into a selected state, and displays only the selected output candidate image on the display area P in a selected state.

If during the execution of the second selection process, a spatial moving amount obtained by subtracting the spatial distance Z (start spatial distance) detected by the distance detecting part 412 at the time of starting an execution of the second selection process from the spatial distance Z detected by the distance detecting part 412 is less than or equal to the reference moving amount (S24, S25; YES, S26; NO, S27; YES), the instruction receiving part 12 receives an instruction to output the output candidate images displayed on the display area P in a selected state (S31).

Therefore, a user enables only output candidate images corresponding to option images whose projection image PV of the indicator D is overlapped to be displayed in a selected state merely by waiting for a time limit while keeping the indicator D having an area less than a threshold close to the display area P. Then, a user enables an instruction to output the output candidate image displayed in a selected state to be received by the instruction receiving part 12 merely by further letting the indicator D come closer to the display area P.

In other words, a user allows an instruction to output the output candidate images corresponding to option images whose projection image PV of the indicator D on the display area P is overlapped by taking a palm as the indicator D, by setting an area of the indicator D to a value greater than or equal to a threshold, and by waiting for a time limit while keeping the indictor D close to the display area P, followed by performing an operation of further letting the indicator D come closer to the display area P. This further improves operability of an operation performed by a user using the indicator D.

Moreover, if an instruction to output a selected output candidate image is received by the instruction receiving part 12 (S31), the process execution part 14 outputs output candidate images to be output indicated by the instruction (S32).

On this account, a user enables the output candidate image to be output indicated by an instruction received by the instruction receiving part 12 only by performing an operation of letting the indicator D come closer to the display area P.

It should be noted that the above-mentioned embodiment is mere illustration of the embodiment according to the present disclosure, and is not intended to limit the present disclosure to the above-mentioned embodiment. For example, the present disclosure may be a modified embodiment to be shown in the following.

(1) For example, in step S32, the process execution part 14 may display an operation screen whose output condition is settable when a predetermined output process is executed, in place of executing the predetermined output process for outputting output candidate images to be output indicated by an instruction received in step S31.

Figure 12:
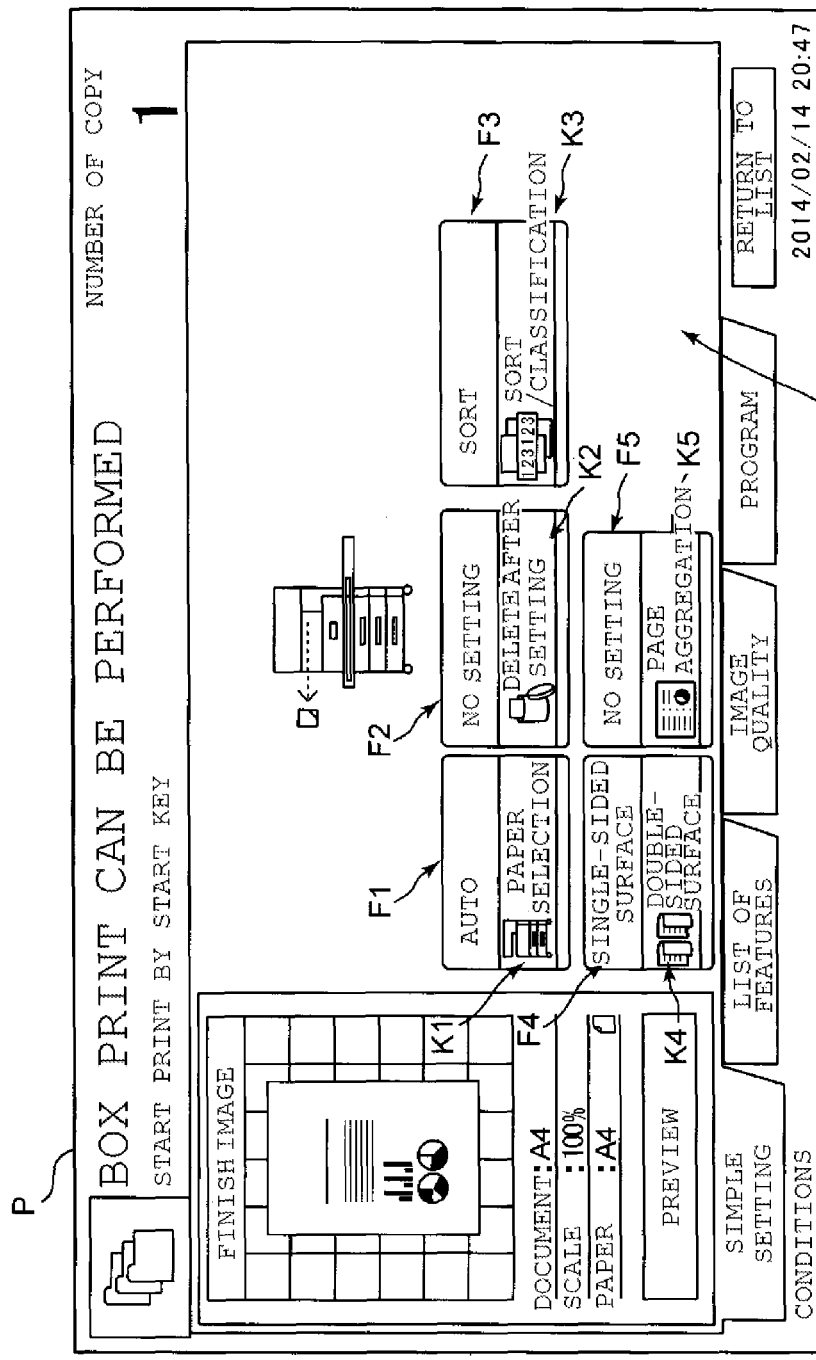
FIG. 12 is a drawing showing a print condition setting screen.

FIG. 12 is a drawing showing a print condition setting screen W2. For example, the predetermined output process is assumed to be a print process. In this case, in step S32, the process execution part 14 may display the print condition setting screen W2 shown in FIG. 12 on the display area P, as an operation screen whose print condition is settable.

The print condition setting screen W2 includes a soft key K1 to set a paper size, a soft key K2 to set whether an image output after printing is stored or not in the storage part 5, a soft key K3 to set whether a condition of sorting/classifying a paper on which an image is formed or not, a soft key K4 to set whether an image is printed or not on a double-sided surface or on a single-sided surface, and a soft key K5 to set whether a condition (page aggregation condition) of determining how many one or more images are formed on a sheet of paper in an aggregated manner. Additionally, the print condition setting screen W2 includes display fields F1 to F5 to display a setting value set to each print condition indicated by each soft key K1 to K5.

An operation to set each print condition through the print condition setting screen W2 is performed in a similar manner. For this reason, only an operation of setting a paper size using the soft key K1 will be described later, for the sake of brevity, on behalf of the operation.

Lets us suppose here that the spatial distance Z between the indicator D and the display area P is less than or equal to the second distance Z2, as a consequence of letting the indicator D come closer to the soft key K1 by a user. In this case, the instruction receiving part 12 determines that the soft key K1 is selected by a user, and receives a display instruction for a candidate value settable as a paper size correlated with the soft key K1.

In this instance, the process execution part 14 displays on the display area P an option image indicating a candidate value (for example, "Auto", "A4", "B4" or the like) settable as a paper size following the display instruction. In this connection, each candidate value is stored in a non-volatile memory. Thereafter, lets us suppose here that the spatial distance Z between the indicator D and the display area P is less than or equal to the second distance Z2, as a consequence of letting the indicator D come closer to the option image indicating the candidate value displayed on the display area P. In this case, the instruction receiving part 12 determines that the candidate value corresponding to the option image, to which the indicator D comes closer, is selected by a user. Then, the instruction receiving part 12 receives a setting instruction to set the selected candidate value as a paper size.

In this case, the process execution part 14 stores information indicative of a paper size and the candidate value indicated by the instruction in the RAM correlated with each other. Thereby, the process execution part 14 sets the candidate value as a paper size. Further, the process execution part 14 displays the candidate value set as a paper size on the display field F1. For example, the print condition setting screen W2 shown in FIG. 12 shows that a candidate value "Auto" is set as a paper size.

In this connection, when a start key (not shown) provided in an operation key part 42 is pressed by a user, after each print condition is set using the print condition setting screen W2, the instruction receiving part 12 receives an execution instruction for a print process through each set print condition.

In this case, the process execution part 14 executes a print process using the each print condition set through the print condition setting screen W2 following the execution instruction received by the instruction receiving part 12. In other words, the process execution part 14 acquires output candidate images to be output indicated by an instruction received in step S31 from the storage part 5. Then, the process execution part 14 causes the image forming part 3 to form the acquired output candidate image on a paper under the above-mentioned each print condition.

According to the present modified embodiment, a user enables an operation screen, whose output condition is settable when output candidate images to be output are output indicated by an instruction received by the instruction receiving part 12, to be displayed on the display area P merely by performing an operation to let the indicator D come closer to the display area P.

(2) Alternatively, in step S32, the process execution part 14 may display on the display area P an operation screen, whose output process is selectable to be used when output candidate images to be output are output indicated by an instruction received in step S31, in place of executing a predetermined output process for outputting the output candidate image to be output indicated by the instruction received in step S31.

Figure 13:
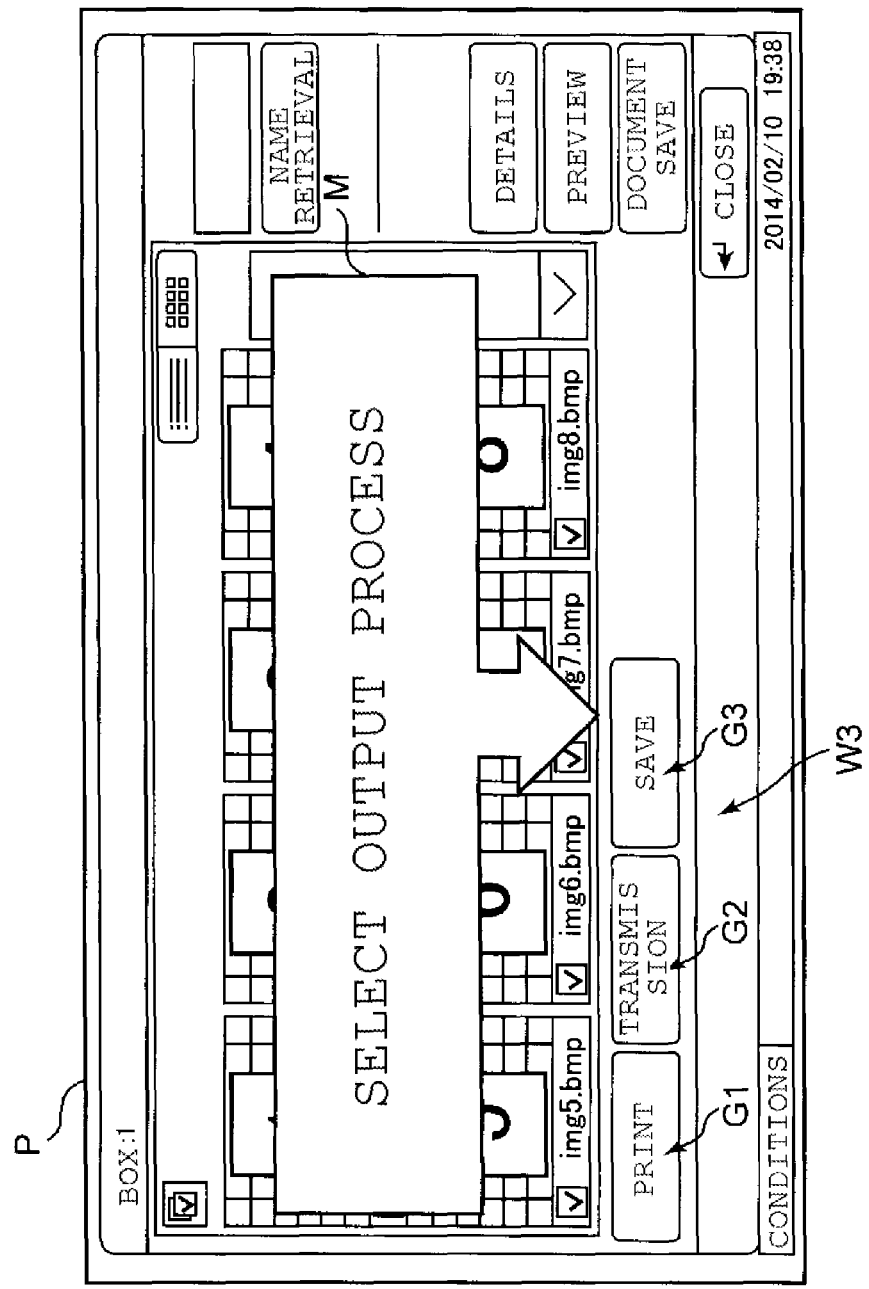
FIG. 13 is a drawing showing an output process selecting screen.

FIG. 13 is a drawing showing an output process selection screen W3. For example, in step S32, the process execution part 14 may display the output process selection screen W3 shown in FIG. 13 on the display area P as an operation screen whose output process is selectable.

The output process selection screen W3 includes an option image G1 to select a print process as an output process, an option image G2 to select a transmission process as an output process, and an option image G3 to select a storage process as an output process.

An operation to select each output process through the output process selection screen W3 is performed in a similar manner. On this account, only an operation of selecting a print process using the option image G1 will be described later, for the sake of brevity, on behalf of the operation.

Lets us suppose here that the spatial distance Z between the indicator D and the display area P is less than or equal to the second distance Z2, as a consequence of letting the indicator D come closer to the option image G1 by a user. In this case, the instruction receiving part 12 determines that the option image G1 is selected by a user, and receives a selective instruction to select a print process correlated with the option image G1 as an output process.

In this case, the process execution part 14 takes an output process when output candidate images to be output are output indicated by an instruction received in step S31, as a print process following the selective instruction. Then, the process execution part 14 acquires output candidate images to be output indicated by an instruction received in step S31 from the storage part 5. Subsequently, the process execution part 14 forms the output candidate image acquired by the image forming part 3 on a paper under the above-mentioned prescribed print conditions.

According to the present modified embodiment, a user enables an operation screen whose output process is selectable when output candidate images to be output are output indicated by an instruction received by the instruction receiving part 12, to be displayed on the display screen P merely by performing an operation to let the indicator D come closer to the display area P.

(3) Alternatively, when, during the execution of the first selection process, a spatial moving amount obtained by subtracting the spatial distance Z detected by the distance detecting part 412 at the time of starting an execution of the first selection process from the spatial distance Z detected by the distance detecting part 412 is less than or equal to the predetermined reference moving amount, the instruction receiving part 12 may receive an instruction to output only output candidate images corresponding to option images displayed on the display area p in a selected state out of the plurality of output candidate images stored in the storage part 5.

Namely, in the first selection process, the selection control part 13 may bring only output candidate images corresponding to all the option images displayed on the display area P into a selected state, and display only the selected output candidate images on the display area P in a selected state, in place of bringing all the selected output candidate images stored in the storage part 5 into a selected state, and displaying all the selected output candidate images on the display area P in a selected state.

For example, lets us suppose here that when the operation screen W1 shown in FIG. 5 is displayed on the display area P, as shown in FIG. 8, a user takes a palm as the indicator D, and a time limit has elapsed while keeping the indicator D close to the display area P. Further, lets us suppose here that a detected area that is an area of the projection image PV of the indicator D is greater than or equal to a threshold, and consequently that the selection control part 13 executes in step S23 the modified first selection process. In this context, the storage part 5 is assumed to be storing fifteen output candidate images.

In this case, in the modified first selection process, the selection control part 13 stores an electronic file name of the eight output candidate images stored in the storage part 5 corresponding to the eight option images D1 to D8 displayed on the display area P. Thereby, the selection control part 13 brings only the output candidate images corresponding to all the option images D1 to D8 displayed on the display area P into a selected state in the modified first selection process.

Further, the selection control part 13 displays check boxes in the eight option images D1 to D8 in a checked state in order for a user to visually recognize that the eight output candidate images are in a selected state. Incidentally, the selection control part 13 does not display the select-all check box B3 in a checked state in the modified first selection process. Thereby, the selection control part 13 displays only the selected eight output candidate images on the display area P in a selected state.

Consequently, when step S31 is executed during the execution of the modified first selection process, the instruction receiving part 12 receives an instruction to output the selected output candidate images, that is, only the output candidate images corresponding to the eight option images D1 to D8 displayed on the display area P in a selected state out of the plurality of output candidate images stored in the storage part 5.

According to the modified present disclosure, a user enables all the output candidate images corresponding to all the option images displayed on the display area P to bring into a selected state, as an image to be output, merely by waiting for a time limit while keeping the indicator D having an area greater than or equal to a threshold close the display area P. Then, a user enables an instruction to output all the selected output candidate images to be received by the instruction receiving part 12 merely by further letting the indictor D come closer to the display area P.

In other words, a user allows an instruction to output all the output candidate images corresponding to all the option images displayed on the display area P to be received by the multifunction printer 1 merely by taking a palm as the indicator D, by setting an area of the indicator D to a value greater than or equal to a threshold, and by waiting for a time limit while keeping the indictor D close to the display area P, followed by performing an operation of further letting the indicator D come closer to the display area P.

(4) While in the above-mentioned embodiment, an example is given in FIG. 3 where the second distance Z2 is set a value greater than 0, not necessarily limited thereto, the second distance Z2 may be 0. In other words, in this case, a user allows an instruction correlated with an option image displayed at a position where the indicator D is contacted to be received by the instruction receiving part 12 by actually bringing the indicator D into contact with the display area P.

(5) Alternatively, step S31, S32 shown in FIG. 9 may be omitted for simplification.

What is claimed is:
1. An image processing apparatus comprising:
  a display part that has a display area on which each of a plurality of output candidate images less than or equal to a predetermined number is selectably displayed out of the plurality of output candidate images selectable by a user as an image to be output;
  a distance detecting part that detects a spatial distance between an indicator used by a user to select the output candidate images and the display area;
  an area detecting part that detects an area of a projection image of the indicator on the display area when the spatial distance detected by the distance detecting part is less than or equal to a predetermined distance;

a selection control part that executes a first selection process for displaying all the output candidate images displayed on the display area in a selected state when the detected area detected by the area detecting part is greater than or equal to a predetermined threshold, and the detected area is not changed for more than a predetermined time limit; and an instruction receiving part that receives an instruction to output the output candidate images displayed on the display area at least in a selected state out of the plurality of output candidate images when a spatial moving amount obtained by subtracting a spatial distance detected by the distance detecting part at the time of starting an execution of the first selection process from the spatial distance detected by the distance detecting part during the execution of the first selection process is less than or equal to a predetermined reference moving amount.

2. The image processing apparatus according to claim 1, wherein the instruction receiving part receives the instruction to output all the output candidate images contained in the plurality of output candidate images.

3. The image processing apparatus according to claim 1, wherein when the detected area is less than the threshold and the detected area is not changed for more than the predetermined time limit, the selection control part executes a second selection process for displaying in a selected state only the output candidate images where the projection image is overlapped, and when the spatial moving amount obtained by subtracting the spatial distance detected by the distance detecting part at the time of starting an execution of the second selection process from the spatial distance detected by the distance detecting part during the execution of the second selection process is less than or equal to the reference moving amount, the instruction receiving part receives the instruction to output the output candidate images displayed on the display area in a selected stated.

4. The image processing apparatus according to claim 1, further comprising a process execution part that outputs the output candidate images to be output indicated by the instruction when the instruction is received by the instruction receiving part.

5. The image processing apparatus according to claim 4, wherein the process for outputting the output candidate images by the process execution part includes a transmission process for converting the output candidate images into an electronic file and outputting the electronic file to a predetermined destination.

6. The image processing apparatus according to claim 4, wherein the process for outputting the output candidate images by the process execution part includes a print process for forming the output candidate images on a paper and printing the paper.

7. The image processing apparatus according to claim 4, wherein the process for outputting the output candidate images by the process execution part includes a storage process for converting the output candidate images into an electronic file and outputting the electronic file to a predetermined destination storage.

8. The image processing apparatus according to claim 1, further comprising a process execution part that displays on the display area an operation screen whose output condition is settable at the time of outputting the output candidate images to be output indicated by the instruction is output when the instruction is received by the instruction receiving part.

9. The image processing apparatus according to claim 1, further comprising a process execution part that displays on the display area an operation screen whose output process is selectable to be used when the output candidate images to be output indicated by the instruction are output, from among a predetermined plurality of output processes when the instruction is received by the instruction receiving part.

10. An image processing method comprising:

selectably displaying each of a plurality of output candidate images less than or equal to a predetermined number on a display area out of the plurality of output candidate images selectable by a user as an image to be output;

detecting a spatial distance between an indicator used by a user for selecting the output candidate images and the display area;

detecting an area of a projection image of the indicator on the display area when the detected spatial distance is less than or equal to a predetermined distance;

executing a selection process for displaying all the output candidate images displayed on the display area in a selected state when the detected area is greater than or equal to a predetermined threshold and the detected area is not changed for more than a predetermined time limit; and receiving an instruction to output the output candidate images displayed on the display area at least in a selected state out of the plurality of output candidate images when a spatial moving amount obtained by subtracting a spatial distance detected at the time of starting an execution of the selection process from the spatial distance detected during the execution of the selection process is less than or equal to a predetermined reference moving amount.

* * * * *